United States Patent [19]
Fuhr et al.

[11] 3,921,147
[45] Nov. 18, 1975

[54] ECG INSTRUMENT

[75] Inventors: Günter Fuhr, Germering, Germany; Heinz Reetz, deceased, late of Munich, Germany, by Hildegard Reetz, heir

[73] Assignee: Fritz Schwarzer GmbH, Munich, Germany

[22] Filed: Feb. 11, 1974

[21] Appl. No.: 441,084

[30] Foreign Application Priority Data
Oct. 11, 1973  Germany............................ 2351167

[52] U.S. Cl. ............................................. 340/172.5
[51] Int. Cl.² ........................ G06F 3/05; G06F 3/14
[58] Field of Search ................................ 340/172.5

[56] References Cited
UNITED STATES PATENTS

| | | |
|---|---|---|
| 3,345,608 | 10/1967 | Brown et al. .................... 340/172.5 |
| 3,566,365 | 2/1971 | Rawson et al. ................... 340/172.5 |
| 3,674,939 | 7/1962 | Brooks .......................... 179/15.55 R |
| 3,810,102 | 5/1974 | Parks et al. ..................... 340/172.5 |

*Primary Examiner*—Gareth D. Shaw
*Assistant Examiner*—Michael C. Sachs
*Attorney, Agent, or Firm*—Joel Wall; William C. Nealon; H. R. Berkenstock, Jr.

[57] ABSTRACT

An ECG computer terminal system for interfacing between ECG equipment and a computer. The ECG equipment can be used to monitor heart action of several patients. The computer is used to analyze the resulting ECG data. The terminal system includes analog to digital conversion, digital storage, transfer of digital information to the computer, manual keyboard control and patient identification of the ECG signals, and multiplexing of these signals.

6 Claims, 1 Drawing Figure

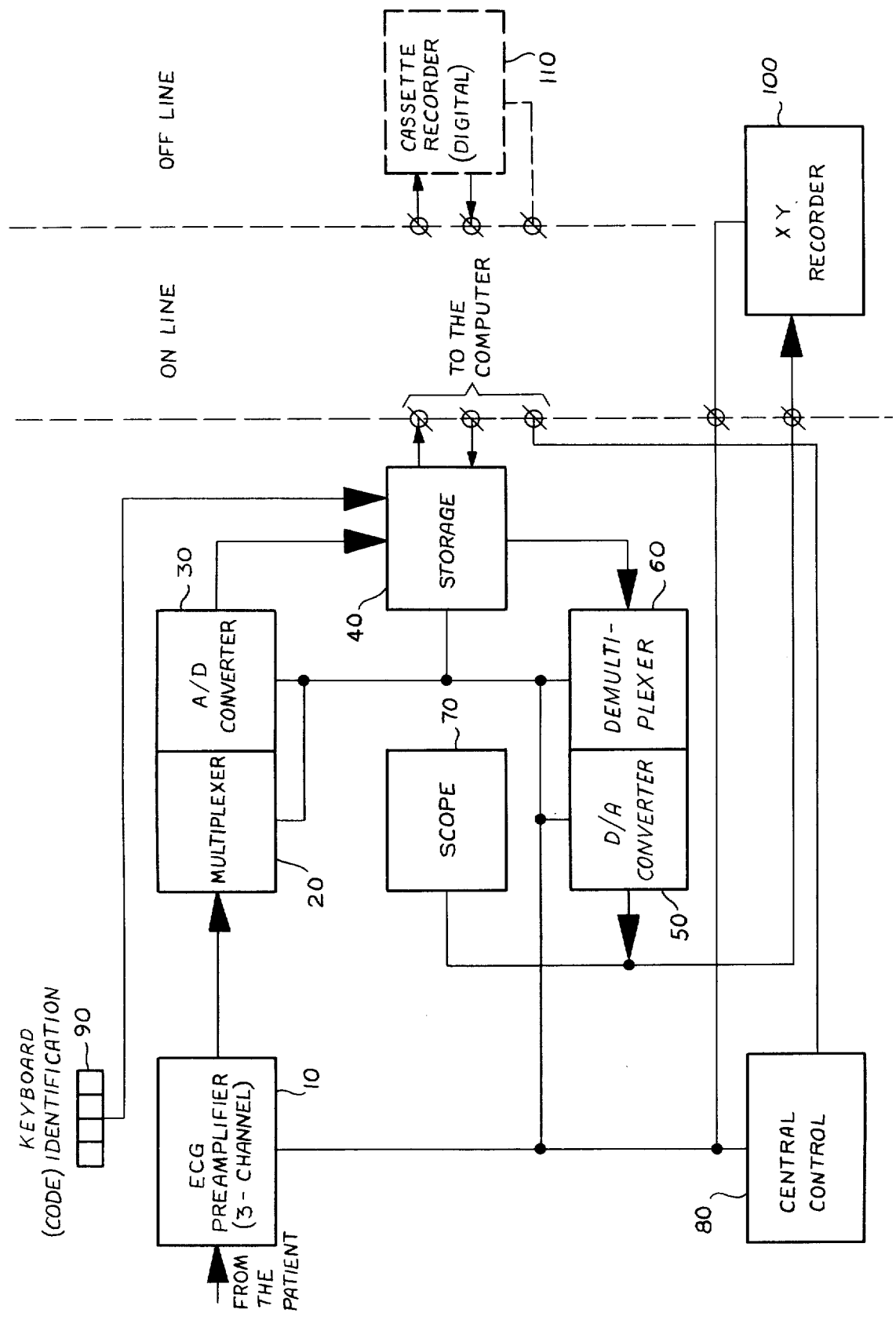

ECG INSTRUMENT

BACKGROUND OF THE INVENTION

1. Field of the Invention

The present invention relates generally to EKG monitoring systems, and more specifically relates to a computer interface for use with such systems.

2. Description of Prior Art

ECG or EKG monitoring systems have been employed in the medical electronics field for some time. A variety of commercial embodiments are in general medical use. The number of electrical connections between the body of a patient to be monitored and the monitoring apparatus can range from three to perhaps fifteen or more depending on the method of EKG monitoring employed. A good reference on this subject is the book entitled "CIBA Collection of Medical Illustrations, Vol 5, Heart" by Frank H. Netter, M.D.

The ECG (electrocardiogram) is an electrical signal which results from a patient's heartbeat activity. This signal is generally observable utilizing chart-paper trace recorders, CRT display devices and other means. The ECG (EKG) signal generally has five or six extremes (peaks or valleys) usually identified by P-Q-R-S-T-U designations. One signal can be analyzed at a time by a trained physician to determine normal and abnormal heart activity. It is in the analysis of many of these signals that a computer is useful, once the signals are converted to computer-usable form.

Computer analysis of the electrocardiogram is a widely developed method for automatic diagnosis. In the past 10 years, several program-systems were developed, which are already being utilized in many clinics for routine evaluation of ECGs. The programs detect typical ECG-zags, measure them according to duration and amplitude, and attempt to provide hints for diagnosis. Automatic evaluation relieves doctors of time-consuming routine tasks, in conjunction with which the computer can achieve an appreciably greater precision. In diagnostic findings of the electrocardiogram, the computer can utilize test results for evaluation, which in daily routine practically cannot be measured (for instance, steep rise in the ORS-complex; spatial vector speed, etc.). Appropriate combinations of these test results have produced very effective diagnostic criteria in many cases.

Reliability of computer programs is not limited by the computer, however, but by diagnostic operational efficiency of the electrocardiogram. Cardial or cardiac changes, which are not demonstrated in the ECG, cannot be detected by the computer either. According to experience, about 80–85 percent of the cardial changes are determinable in the ECG. It is the aim of further program-development to overcome this limitation of diagnostic operational efficiency, as extensively as possible, in the next few years.

The following requirements, which were not satisfied by prior art approaches, must be set for ECG display instruments for computer analysis:

1. The signal should be displayed with the least possible interference, inasmuch as all computer programs are sensitive to technical artifacts. The greatest interference-free utilization would be achieved, if the signal on the patient could be immediately displayed in a form suitable for the computer (digital).

2. Handling should be so simple, that it could be taken care of even by apprentice assistants of the doctor.

3. The essential results of the computer evaluation must be available immediately after the conclusion of the computations, inasmuch as the doctor as a rule needs the findings quickly, and not only after several days have elapsed. The Schwarzer-ECG-Terminal System of the present invention has endeavored to discover the optimal solution for the above-indicated requirements.

The necessary evaluation of ECG data for ECG analysis in data processing equipment requires a computer-compatible transformation of output items or data into digital values. Known instruments of this type contain an additional coding device, in order to transmit into the computer, along with the ECG, given patient identification.

In a known instrument, appropriate for off-line or nondirect computer operation, preamplified ECG signals, together with patient identification, are stored with an analog tape storage device. The tapes are sent to a computer center, and further processed there.

In another instrument type, suitable for on-line or direct-computer operation, ECG signals are rerecorded over a stationary transmission through the telephone network onto the computer. In addition to this, signals are frequency-modulated in the usual way. In this conjunction also, the computer-compatible signal-preprocessing (aid) takes place in the computer center.

In the ECG instrument suitable for an off-line operation, the ECG signal is stored over an A/D converter and a multiplexer on a digital tape. Simultaneously in conjunction therewith, the analog signal, after preamplification for viewing control, can be recorded on a viewing instrument. In so doing, however, it is considered disadvantageous that because of viewing control those errors are not recognizable which could be present in connection with digital storage.

In the known ECG instruments mentioned, which make possible an on-line operation, the data are, transmitted in analog form (FM-modulated, for instance) into the computer. In so doing, the difficulty arises that analog transmission is limited in quality and subject to interference. A digitalized signal, on the other hand, can be transmitted with almost any accuracy desired, because any defects which might occur can be recognized by the simultaneous transmission of test-"flags." Inasmuch as the speed of the digital data transmission, for instance, over data-phone modem, is restricted to the public telephone network, three channels cannot be transmitted in real-time operation simultaneously with the required quality over the telephone line.

It is therefore Applicant's solution to these prior art problems to provide the present invention to perfect an ECG instrument in such a manner that it makes versatile improvement possibilities feasible, and various forms of application possible, especially in on-line operation or in off-line operation; moreover, due to its extremely simple manipulation, it is warranted that possible deficiencies can occur as regards the digital data, which are processed at the computer center.

An ECG instrument corresponding to the present invention affords solutions to the prior art problems, due to solid-state carriage storage, the possibility of readout of data with a slowed-down speed, and to adapt to the speed of the given data line. Inasmuch as the ECG instrument provided with a viewing device can be equipped with a complete input keyboard, a dialogue communication in on-line operation can be effected with the computer. Thus, for instance, anamnesis data can be called from the instrument, and the analysis result can be played back on the viewing device.

SUMMARY OF THE INVENTION

The present invention relates to an ECG computer terminal system for interfacing between ECG equipment and a computer. The present invention thus relates to an improved ECG instrument.

In such a type of ECG instrument, ECG signals are held, for a limited time span (about 10 seconds) in digital form in a digital memory storage, and additionally brought over a viewing device in analog form for demonstration, wherein any desired portion of the curve sequence can be observed, before the display is released for reproduction at the computer center, or for storage on a tape cartridge (cassette). Through the reconversion of digital signals back, it is therefore possible to once more control overall data (patient identification, calibration, ECG), which stands ready in the memory storage for insertion into the computer. Therefore, along with testing of ECG signals for artifacts (muscle tremble, poor seating of electrodes, etc.), quality of digitalization can be controlled, because the analog signal achieved through reconversion adequately reflects the data quantity which is later evaluated by the computer. Any contingent defects in multiplexing or A/D-conversion (for instance, through failure or deficiency of constructional elements), as well as any contingent overloading, can thus be perfectly recognized. Inasmuch as alphanumeric patient identification simultaneously appears on the viewing device, keying mistakes can be checked in so doing, in conjunction with the input of the patient number.

Carriage storage of data in solid-state memory storages further affords the possibility to demonstrate vector loops on the viewing device as a vertical image, or to detail over an XY-recorder at a slow pace and in a magnified scale, which in instruments is only possible photographically.

In off-line operation, data is stored from the solid-state storage onto digital cartridges. The cartridge (cassette) is low-priced, and occupies little space; it can therefore be readily sent (mailed) or filed. Tape storage in digital form affords the advantage that unavoidable fluctuations of tape speed, which during analog display lead to signal distortions, remain without (or have no adverse) influence.

It is thus an object of the present invention to provide an improved EKG instrument.

It is further an object of the present invention to provide an improved ECG computer terminal system.

Other objects and advantages of the present invention will become apparent to those of ordinary skill in the art after referring to a detailed description of the appended drawings wherein:

BRIEF DESCRIPTION OF THE DRAWINGS

The drawing depicts an illustrative block diagram embodiment of the present invention.

DETAILED DESCRIPTION OF THE PREFERRED EMBODIMENTS

By way of introduction, the terminal does not serve only for the usual recording of ECG-signals, but permits a genuine dialogue-communication with the computer. Through versatile constructional possibilities, it can satisfy requirements of electrocardiography in clinics, in medical practice, and in health-checks. The block circuit shown diagrammatically indicates construction and mode of operation of the terminal.

ECG-potentials taken from the patient are fed in, then preamplified over an impedance transformer. The input amplifier unit is equipped with a device for automatic circuit choice (including Einthoven, Goldberger, Wilson, and Frank lead connections). The analog system can be displayed on a triple recorder without additional amplifiers. After start of the recording program, the signals extend, over a multiplexer, to an analog-digital converter, which converts amplitude of the signal into a computer-compatible numerical value (digitalized). The digitalized ECG-signals are displayed in a digital memory device, operating as a buffer. Content of the memory or storage can be demonstrated on the image-screen device. This control takes place in such a manner that the stored, digitalized ECG-signals are converted back into analog values and in the original derivatives, and demonstrated on a built-in scope. The ECG appears as an upright image in a period of time or sector of 3–4 seconds and by a simple shifting of storage locations, in its entirety.

A test can be made on the image-screen to determine whether ECG-signals are being received interference-free. In conjunction therewith, the display shows or takes place of an image comparable to an outflowing recording strip (non-fading display). Through this control possibility, recording can be immediately repeated, if defective display is encountered. After perfect display, the ECG is immediately transmitted to the computer, or else displayed on a small digital (magnetic tape) cartridge. Even after transmission to the computer, the ECG-signal is further available. On the image-screen, two derivatives can be demonstrated in every case, in vector form, so that the doctor or physician can observe the vector loop, without additional equipment, as an upright image. For display of the signals, a recorder can be inserted, on which ECG signals can also be displayed with magnified amplitude. This recorder, furthermore, is in the position to directly demonstrate vector loops, which heretofore was possible only by a photographic display. The frequency transposition required for direct displaying, takes place digitally in the memory storage.

Now with regard to detailed operation, referring to the drawing, ECG potentials tapped from the patient first reach 3-channel preamplifier 10. In contrast to known ECG instruments, the preamplifier is equipped with program-automatics. The derivative selector belonging to this assembly, which likewise can be involved in program-automatics, also encompasses along with the usual derivatives (shunts) according to Einthoven, Goldberger and Wilson, the corrected orthogonal derivatives according to Frank, in conjunction with which impedance converters are provided for all inputs, which assure a very high-ohm input resistance.

However, before the actual automatic program is started, the derivatives formed in this manner in 3 channels are first demonstrated on viewing device or scope 70, so that hum interferences, movement artifacts, myo-potentials, etc. can be recognized, which under given conditions could interfere with automatic evaluation of ECGs through the computer. Further detailed description of this pre-amplifier is not essential to complete understanding of Applicant's invention.

After start of the automatic program, the same signals first flow through multiplexer 20, and from there, reach analog-digital-converter 30 (A/D converter). Digital signal or values attained here, which reproduce or represent in numerical or binary form the periodic flow of ECG potential fluctuations, thereupon flow into a digital solid-state storage, serving as a buffer storage. This storage or memory can be any state of the art memory device including MOS semiconductors or magnetic cores, etc.

After flow of the input unit in the digital program, the stored digital values are then conducted to demultiplexer 60 and to digital-analog converter 50, (D/A converter) and converted back, here, into other analog signals or values, in conjunction with which distribution over multiplexer 60 simultaneously takes place also, into the original 3 derivatives. In this phase of the automatic program, viewing device 70 is switched onto the output of D/A converter 50 and this last-mentioned multiplexer 60, and now reproduces the reconverted ECG. Through a special reading program for storage, production is made of a vertical image in conjunction therewith, in which overall input can be demonstrated by simple, continuous shifting of storage locations called, sectionally. In this manner, uniform control can be effected, to check whether input and also digitalizing, are taking place satisfactorily, so that only now can release take place to the actual automatic analysis. If there is any defective input or digitalization, a corresponding erasure instruction is given, and the input is repeated.

The arrangement described now also simultaneously offers the possibility of visibly demonstrating the reconverted ECG not only in scalar form, but also in vector form on the viewing device, so that therefore, directly after the input, the vector loops can also be demonstrated as vertical images.

A further advantage of this arrangement consists in the fact that compensation recorder 100 is connectable, on which reconverted ECG signals, if desired, can also be displayed with magnified amplitude. Likewise, on this compensation recorder designed as an XY-recorder, vector loops can be directly displayed, as they were previously seen as a vertical image on viewing device 70. This additional equipment hence makes it possible not only to undertake direct documentation for identification sheet at the station, but over and above this, also direct display of vector loops, which heretofore was practically only possible over a photographic display. The required frequency-transposing required for direct display of vector loops takes place in the storage, hence purely digitally.

There also exists the possibility of direct display of analog signals at the output of the 3-channel ECG preamplifier. Here, if this is desired for any special questions, a standard triple recording device (not shown) can be attached, for which no special ECG preamplifier is then required in this instrument.

As is demonstrated in the block circuit figure, linkage between the recording device and the computer (not shown) can take place either off-line or on-line.

In the case of off-line operation, the ECG instrument has, subsequently connected to it, a cartridge (cassette) recorder 110 for digital displays, which draws digitalized data from storage 40, in conjunction with which the control is effected of this display through central control unit 80 of the ECG instrument. The played-out cartridges, in this type of operation, must be brought back to the computer center by messenger, or also by pneumatic tubes, in order to be read in there into the computer over a corresponding interface.

With on-line operation, on the other hand, direct wire connection exists between the ECG instrument and the computer, in conjunction with which, an additional interface is inserted at the computer center, if required. In computers with time-interval method operation, several such type ECG instruments can be switched to the computer at the same time and their data be read in, which represents the form of operation which should be sought, in new centers to be established.

Input keyboard or code identifier 90 provides control signals to storage 40 and thus controls what is viewed on scope 70. It also designates through alpha numerics the identity of the patient whose data is being analyzed.

In this last-described type of on-line operation, the ECG instrument must be connected to individual stations from which ECGs are to be received and transmitted, not specifically at a given site. Rather, we can conduct the linkage existing between station and computer onto the station itself in the form of a ring conduit, so that the mobile ECG instrument can accept on-line operation with the computer practically from any base, through connection onto the ring conduit, by means of a simple plug-in device.

With this type of operation, it is to be further mentioned that central control unit 80 of the ECG instrument is connected with the computer over a separate control conduction, so that data transmission, here also, takes place completely under computer control.

The fact is also involved with developmental possibilities of the instrument described, as is also indicated in the block circuit figure, that data for control purposes can be returned either from cartridge (cassette) recorder (off-line operation) or else also directly from computer (on-line operation) to the instrument. For on-line operation, there is then further afforded the possibility of even returning, should the case arise, analysis-results from the computer into the ECG instrument, to which either a further developed data-viewing device, or attachment of a printer, can be provided, while the XY-recorder also is available for these purposes as graphic reproduction equipment.

The multiplexers, A/D and D/A converters, scope, keyboard, cassette recorder, XY recorder, and computer are all standard items that are available commercially. In the preferred embodiment, ECG preamplifier (3-channel) is commercially available Schwarzer GMBH type EK 1 or type EK 3 preamplifier, (Schwarzer GMBH is the assignee of the present application). Multiplexer 20 is a commercially available Siliconix 4-channel driver with MOS switches designated DG 172. A/D Converter 30 consists of a commercially available Zeltex Inc. integrated circuit (IC) designated ZD 461 along with commercially available Texas Instruments IC flip flops designated Ser. No. 4932 N. Storage unit 40 and demultiplexer 60 are constructed from the following commercially available integrated circuits: Signetics DM 8830, National Semiconductor NH 0025 C, Signetics 2525, and Texas Instruments SN 7403. D/A Converter 50 is commercially available integrated circuit Zeltex ZD 431. Scope 70 is a standard instrument. Central control 80 is likewise constructed from standard integrated circuits connected in conventional manner; the integrated circuits employed are: Texas Instruments Ser. Nos. 7400, 7407, 7410, 7475, 7495, 74157, 7483, 7476, 7442, 74151, 74154, 7413, 7437, 7492, Motorola MM 5300, and Signetics 8223. XY-Recorder 100 employs Servogor Company model RE 551, Goertz, Austria. Finally, cassette recorder 110 employs Philips Professional Cassette System 8920 401 40301. Thus, no further detail appears to be necessary in order to completely understand Applicants' invention.

Recapitulating, after passing through high impedance buffer amplifiers, the patient's ECG potentials along with appropriate identification numerals are fed into a three-channel preamplifier system with automatic lead programmer for 3, 12 or 15 lead programs. The three data channels then feed through the multiplexer and A/D converter into the memory; at the same time, the data flow returns, via the D/A converter demultiplexer combination to the three-channel analog chart and/or non-fading scope display now serving as an "overall" last quality check. This check prevents interferences such as 60 Hz, myo-potentials, moving artifacts, etc. from entering with the data signal before the actual program sequence is started. If there is an interference or malfunction between input and output of the complete terminal it will now show on the chart and/or screen. A push button command will erase the erroneous section in the memory and a repeat start will be initiated. The oscilloscope, in its vector mode of operation, allows the additional display of a standing loop. As an option, a special X/Y-recorder can be added to provide an augmented display of the ECG configurations and if desired, the vector loops. In certain cases, the X/Y-recorder display may replace the three-channel chart write-out. This arrangement would provide for hard copy (augmented orthogonal and "instant" vector loop) at bedside.

As indicated in the block diagram, communication between terminal and computer may be done in on-line or off-line mode. For the off-line mode, a digital cassette serves as interim storage, recording all data from the terminal's memory, according to directions from the terminal's central control.

In the on-line mode, the different terminals are not restricted to any fixed locations. A practically unlimited number of rooms or areas can participate in a "loop circuit" leading from room to room. Each bedside area included in this computer input loop is equipped with a simple plug to which the mobile terminal may be connected at any time for full computer on-line communication. In this mode, the central control of the terminal is directly connected to the computer by means of a separate control line, thus insuring full computer control of the data transmission. As indicated in the block diagram further options are available. Certain data, for control purposes, etc., may be returned to the terminal either from the cassette recorder (off-line) or directly from the computer (on-line).

During the on-line mode, analysis results can be returned in a real time mode via either the oscilloscope, expanded to serve as an output data display, an added mechanical printer or the X/Y-recorder can serve as a graphical display of the analysis data.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An ECG computer terminal system for interfacing between ECG equipment and a computer, said equipment being used for monitoring heart activity of at least one patient, said computer being used to analyze said monitored heart activity, said system comprising means for amplifying electrical analog signals from said equipment, first means for converting said analog signals to digital signals, means for temporarily storing said digital signals, second means for providing other analog signals corresponding to said stored digital signals while not removing said digital signals from said temporary storing means, means for viewing said other analog signals to determine quality of said other analog signals and thereby determine quality of said stored digital signals, manual keyboard control means connected to said temporary storing means for eliminating certain of said digital signals from said temporary storing means, and means for transferring other of said digital signals from said temporary storing means to the input of said computer.

2. A system as recited in claim 1 and wherein said first means includes third means for multiplexing said electrical analog signals, said second means includes fourth means for de-multiplexing said other analog signals, said manual keyboard control means further comprising means for providing digitized alphanumeric patient information to said storage means corresponding to said digital signals, said second means further including alphanumeric display means for providing said patient information to said viewing means whereby identification of said other analog signals is achieved.

3. A system as recited in claim 1 and wherein said transferring means includes permanent storing means for permanently storing said digital signals.

4. A system as recited in claim 3 and wherein said permanent storing means comprises a magnetic tape recorder.

5. A system as recited in claim 1 further including an XY recorder for recording said other analog signals.

6. A system as recited in claim 5 further including means for displaying vector loops on said XY recorder.

* * * * *